Sept. 22, 1953 S. G. HARRIS 2,652,588
APPARATUS FOR RECOVERING OYSTERS
Original Filed June 28, 1950 2 Sheets-Sheet 1
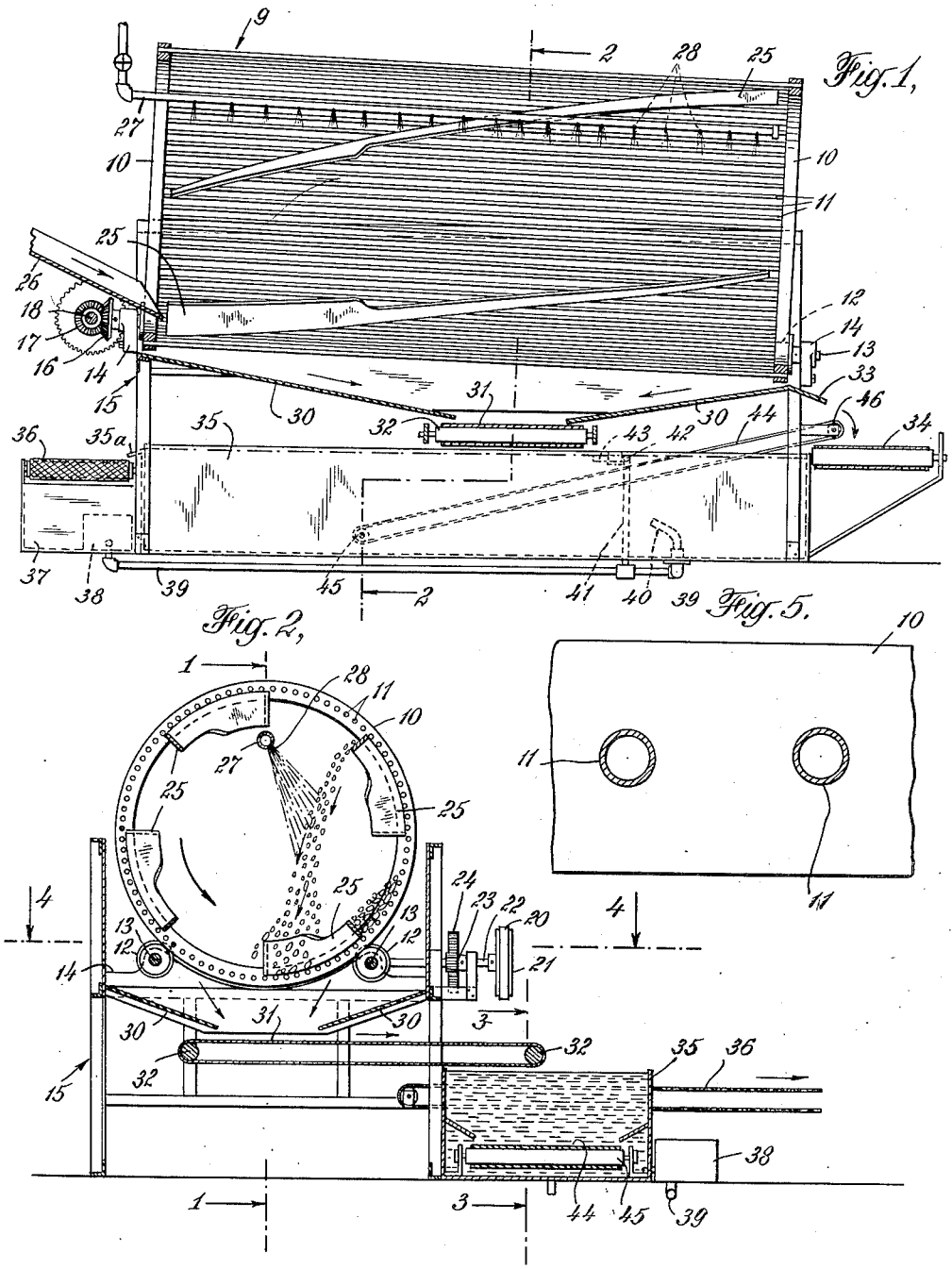
INVENTOR
Sterling G. Harris
BY
Pennie Edmonds Morton Barrows Taylor
ATTORNEYS Sept. 22, 1953  S. G. HARRIS  2,652,588
APPARATUS FOR RECOVERING OYSTERS
Original Filed June 28, 1950  2 Sheets-Sheet 2
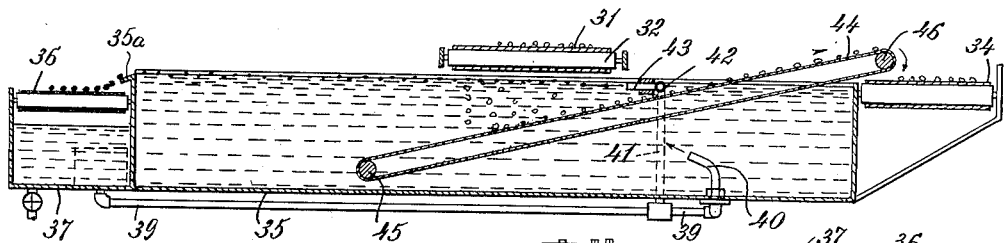
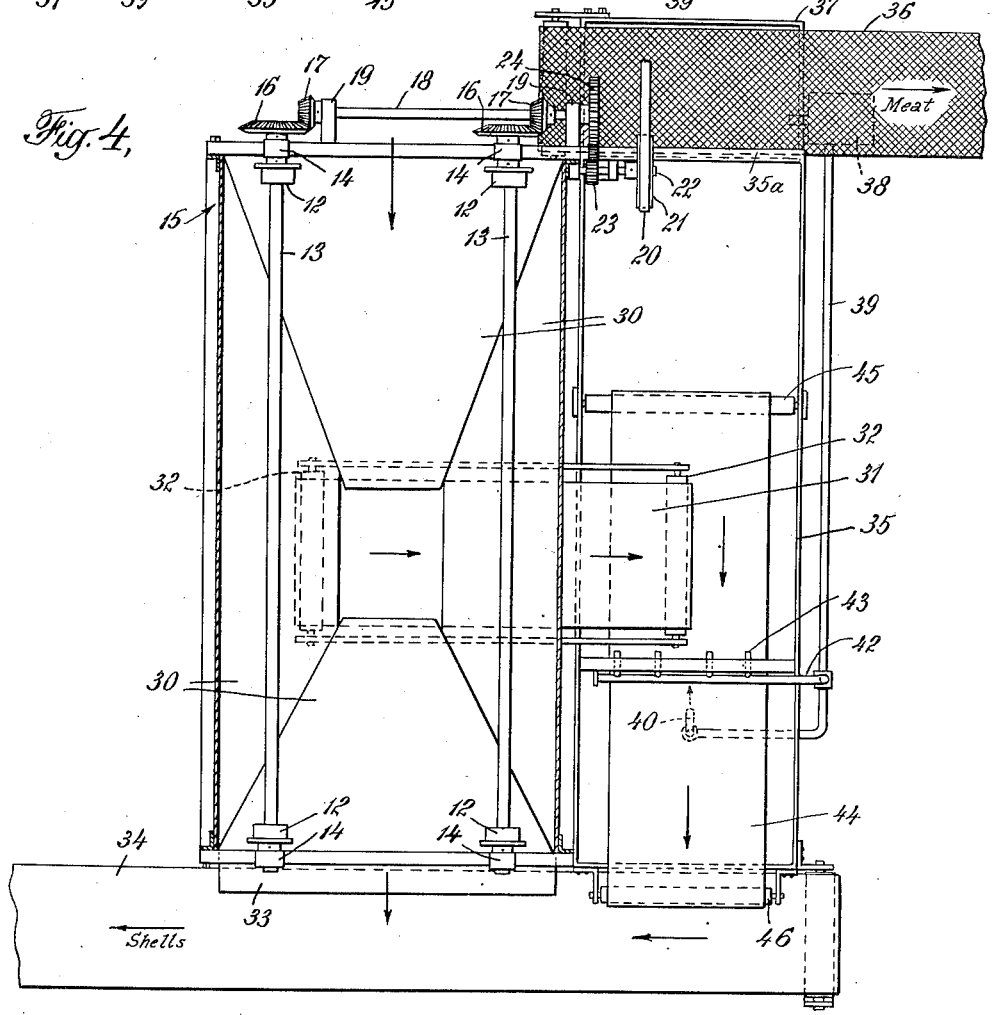
INVENTOR
Sterling G. Harris
BY
Pennie Edmonds Morton Burrows Taylor
ATTORNEYS Patented Sept. 22, 1953

2,652,588

UNITED STATES PATENT OFFICE 2,652,588

APPARATUS FOR RECOVERING OYSTERS

Sterling G. Harris, Beaufort, S. C., assignor to Blue Channel Corporation, Port Royal, S. C., a corporation of Maryland Original application June 28, 1950, Serial No. 170,789. Divided and this application November 20, 1951, Serial No. 257,378

1 Claim. (Cl. 17—2)

This invention relates to the processing of oysters to prepare them for canning and is concerned more particularly with a novel apparatus for recovering oyster meats from their shells.

Heretofore, in the canning of oysters, the usual preliminary operations have involved washing the oysters and then heating them in a steam box to cause the shells to open, after which shuckers pick the meats from the shells by hand. This method of extracting the oyster meats is slow, so that the output of a shucker is small, and, as labor costs have recently increased as a result of legislation, the cost of production has risen to the point where it is difficult to can oysters by present methods at a profit.

The present invention is accordingly, directed to the provision of a novel apparatus for recovering oyster meats from their shells, and the new apparatus is of simple construction and easy to operate, and can be used to handle the oysters in bulk and separate the meat from the shells with little loss. In the new apparatus, the oysters which have been steamed so that the shells are opened and the adhesion of the meats to the shells is greatly weakened, are raised repeatedly to a considerable height and allowed to fall, while water jets at high pressure are directed against the falling oysters. The combined effect of the impact and the water jets on the oysters quickly frees the meats from the shells, and the meats are carried away with the water as they are released. The apparatus includes an inclined rotating cylindrical drum having openings in its curved wall, through which the oyster meats may pass, while the shells are substantially all retained. The drum is preferably made of a pair of end rings connected by longitudinal members spaced sufficiently to permit the meats to pass between them, while the shells are substantially all retained. The drum is provided with internal baffles, which raise the steamed oysters nearly to the top of the drum, as the latter rotates, and then allow the oysters to fall and strike the inner surface of the drum or other oysters therein. A water supply pipe extends into the drum lengthwise of the latter and is perforated at intervals, the perforations being placed so that, when water under high pressure is supplied to the pipe, a plurality of jets shoot through the perforations and strike the oysters falling from the baffles.

For a better understanding of the invention, reference may be made to the accompanying drawings, in which:

Fig. 1 is a view in vertical section on the line 1—1 of Fig. 2 of the preferred form of the apparatus;

Fig. 2 is a sectional view on the line 2—2 of Fig. 1;

Fig. 3 is a sectional view on the line 3—3 of Fig. 2;

Fig. 4 is a sectional view on the line 4—4 of Fig. 2, with the drum removed; and Fig. 5 is a fragmentary sectional view showing a pair of the longitudinal members of the drum in full size and actual spacing.

The apparatus illustrated in the drawings comprises a cylindrical drum 9 formed by end rings 10 connected by spaced longitudinal members 11, which may be pipes. The pipes are spaced to permit oyster meats to pass between them, while substantially all the shells are retained, and a drum about 10' long and made up of end rings and ½" pipes spaced about 1⅝" is satisfactory. The drum is supported, at a slight incline to the horizontal, on flanged rollers 12, on which the end rings rest and which are fast on shafts 13. The shafts are supported at their opposite ends in bearings 14 on a framework 15 and each shaft has a bevel gear 16 at its upper end meshing with a like gear 17 on a shaft 18 mounted in bearings in brackets 19 on the framework. Shaft 18 is driven from a source of power by a belt 20 driving pulley 21 on a shaft 22, the shafts 18 and 22 being connected by gears 23 and 24 on the respective shafts.

A plurality of baffles 25 are secured to pipes 11 within the drum and extend helically from one end to the other. Each baffle is relatively wide for about a third its length starting at the upper end of the drum and is narrow for the rest of its length. The steamed oysters are fed into the upper end of the drum by means of a feed chute 26 and are immediately picked up by the wide portions of the baffles, raised to near the top of the drum, and then allowed to fall. A water pipe 27 extends lengthwise within the drum near its top and the pipe has a plurality of orifices 28 for directing jets of water upon the oysters, as they are raised by the baffles and released to drop to the bottom of the drum. The water is supplied to the pipe under pressure such that the combined action of the jets and the impact, to which the oysters are subjected, releases the meats from their shells. The greater part of the meats are freed in the upper third of the drum but the impact and jet action continue during the travel of the oysters to the lower end of the drum to insure complete recovery of the meats.

The freed meats escape with the water through the openings between the pipes of the drum and the meats fall on pans 30 on the framework beneath the drum and are washed from the pans to a conveyor belt 31 trained over rollers 32. After repeated lifting and dropping, the shells are discharged upon an inclined plate 33, from which they fall upon a conveyor belt 34 to be carried to a disposal point.

The oyster meats, together with any shell material, which may have passed between the pipes of the drum, are discharged from conveyor belt 31 into a flotation tank 35 extending lengthwise of the drum at one side thereof and containing a brine of such salinity as to float the meats and permit the shell material to sink. The end wall of the tank adjacent the feed end of the drum is slightly lower than the other walls of the tank to provide an overflow 35a, which is directed upon a screen conveyor belt 36 overlying an overflow tank 37 for collecting the brine passing through the belt. A pump 38 connected to tank 37 withdraws brine from the tank and discharges the brine through a pipe 39 leading to one or more nozzles 40 within the flotation tank and through a branch 41 to a manifold 42 extending across tank 35 and provided with nozzles 43. Nozzles 40 and 43 lie beyond the conveyor belt 31 and discharge toward the overflow end of tank 35. Nozzle 40 lies well within the body of liquid in the tank and is directed slightly upwardly, while nozzles 43 are directed horizontally and lie just below the level of the liquid in tank 35. The liquid entering tank 35 through the nozzles, accordingly, causes a current in the tank, which carries the floating oyster meats rapidly to the overflow end of the tank.

An inclined conveyor belt 44 is trained about a roller 45 mounted between the walls of the flotation tank 35 and a roller 46 supported by the framework of the apparatus above the conveyor belt 34. Belt 44 dies within the flotation tank beneath the discharge end of belt 31 and is driven by any suitable means. Any shell material discharged with the oyster meats in tank 35 falls upon belt 44 and is carried out of the tank and deposited on shell conveyor belt 34 to be carried away with the shells discharged from the drum.

In the use of the apparatus described, the oysters in the shell are preliminarily washed and then steamed for about 9 minutes at a temperature of 240° F. The steaming for this period at the high temperature not only results in the opening of all the shells but also weakens the adhesion of the meat to the shells, so that recovery of the meats is facilitated. In the lifting and dropping of the oysters in bulk within the drum, while they are subjected to the action of the water jets, the meats freed from the shells quickly pass out of the mass of shells and escape between the longitudinal members of the drum, so that there is little likelihood of damage being done to the meats.

A form of drum found to be satisfactory is about 10′ long, 4′ in diameter and has a pitch of about 1″ per 3′ of length. The drum is rotated at 20 to 22 R. P. M. In a drum of the construction described, the shells remain within the drum long enough to ensure the recovery of practically all the meats, and few shells escape between the longitudinal members of the drum. If the pitch is increased, the shells travel so rapidly through the drum that some meats may be carried with them, while a decrease in pitch is likely to increase the number of shells, which escape from the drum with the meats.

The several conveyor belts of the apparatus are driven by any suitable means and operate without attention to deliver the meats and shell material to the flotation tank, to remove the shell material from the tank, to carry away the shells, and to carry away the meats. The brine overflow is collected in the overflow tank and returned by the pump to the flotation tank, so that the flotation operation is carried out automatically. The conveyor belt 36, on which the meats are deposited, travels slowly and may serve as an inspection table, if desired.

This application is a division of my co-pending application Ser. No. 170,789, filed June 28, 1950, now Patent No. 2,608,716.

I claim:

Apparatus for freeing the meats from steamed oysters and separating the meats from the shells, which comprises a drum mounted for rotation on an axis inclined at a low angle to the horizontal, the drum being formed of a pair of end rings connected by parallel longitudinal members spaced to permit oyster meats to pass between them while holding back oyster shells, a plurality of baffles mounted on the longitudinal members inside the drum and extending through the drum on a helical curve of a pitch longer than the drum, each baffle having a substantial width for less than half its length starting from the high end of the drum and being relatively narrow for the remainder of its length, means within and extending through the length of the drum for directing high pressure jets of water from near the top of the drum toward the rising side only of the drum, and means beneath the drum for collecting oyster meats passing between the longitudinal members of the drum.

STERLING G. HARRIS.

References Cited in the file of this patent

UNITED STATES PATENTS

| Number | Name | Date |
| --- | --- | --- |
| 2,047,688 | Jenkins | July 14, 1936 |
| 2,331,855 | Vucassovich | Oct. 12, 1943 |

FOREIGN PATENTS

| Number | Country | Date |
| --- | --- | --- |
| 571,720 | France | Feb. 7, 1924 |
| 601,692 | France | Dec. 10, 1925 |
| 303,155 | Great Britain | Mar. 21, 1929 |